Nov. 24, 1964        J. HENCHERT ETAL        3,158,284
PLASTIC HANDLE AND CLEAT ATTACHMENT FOR CONTAINERS
Filed March 30, 1961                    3 Sheets-Sheet 1
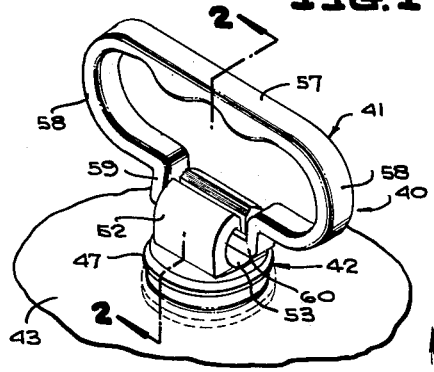
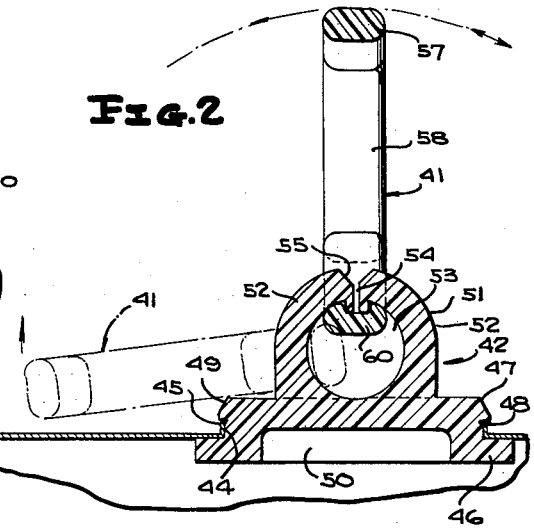
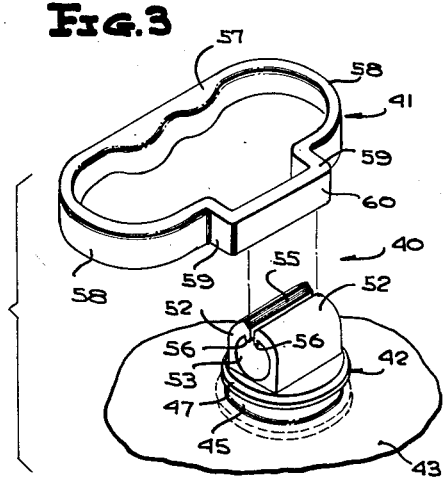
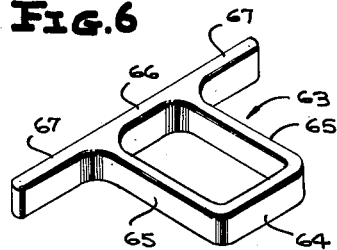
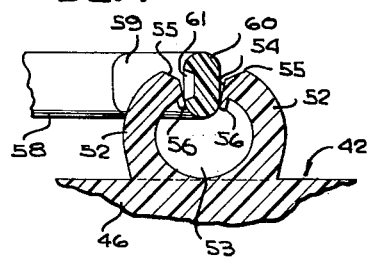
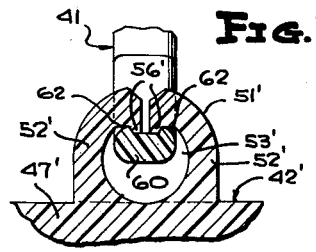
INVENTORS
JOHN HENCHERT &
HENRY E. FRANKENBERG
BY
Mason, Porter, Diller & Stewart
ATTORNEYS Nov. 24, 1964 J. HENCHERT ETAL 3,158,284
PLASTIC HANDLE AND CLEAT ATTACHMENT FOR CONTAINERS
Filed March 30, 1961 3 Sheets-Sheet 2
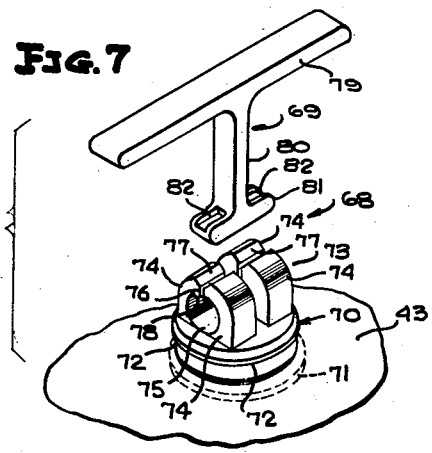
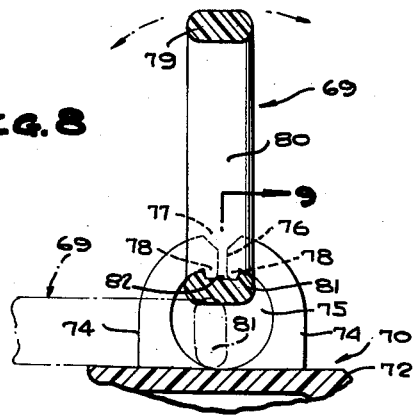
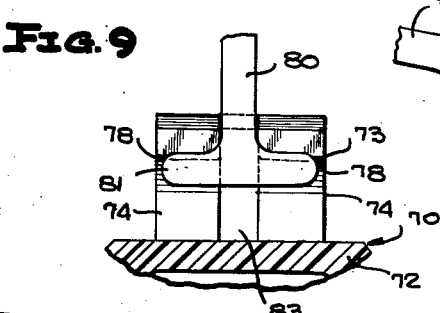
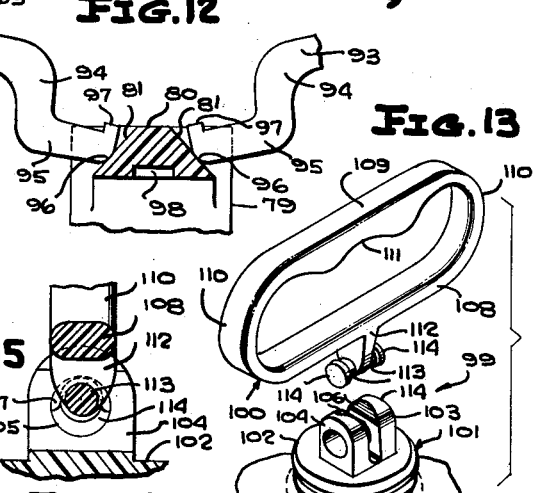
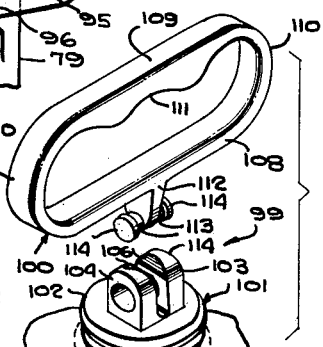
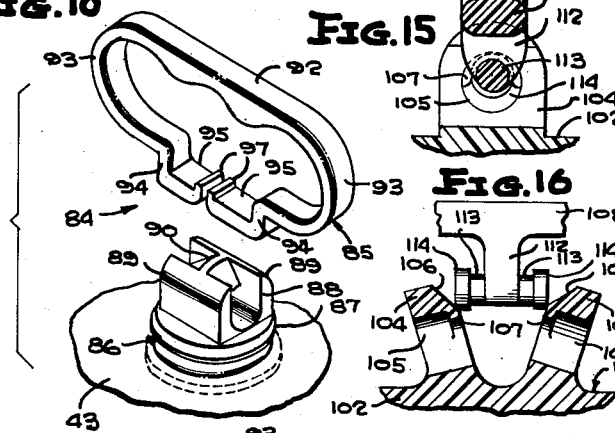
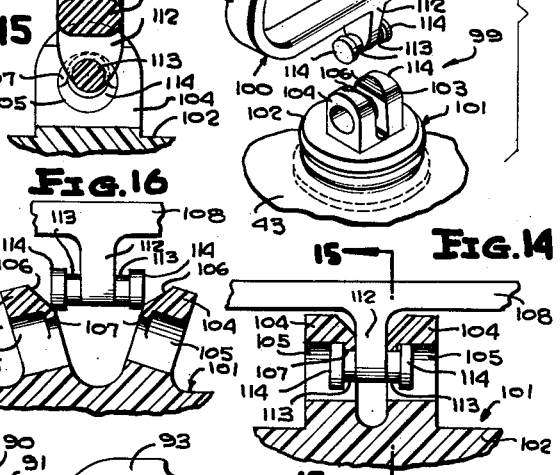
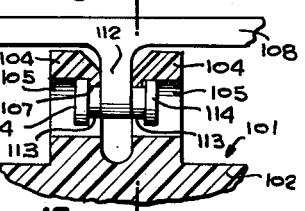
INVENTORS
JOHN HENCHERT &
HENRY E. FRANKENBERG
BY
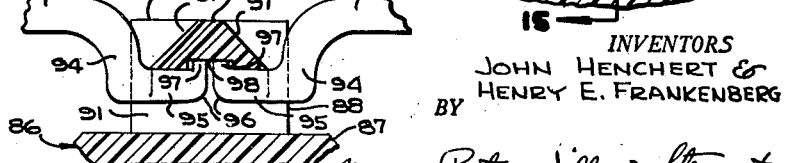
ATTORNEYS Nov. 24, 1964  J. HENCHERT ETAL  3,158,284
PLASTIC HANDLE AND CLEAT ATTACHMENT FOR CONTAINERS
Filed March 30, 1961  3 Sheets-Sheet 3
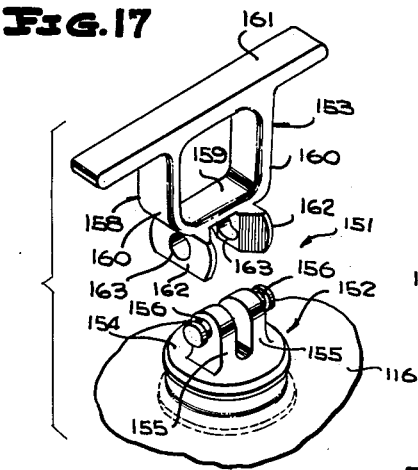
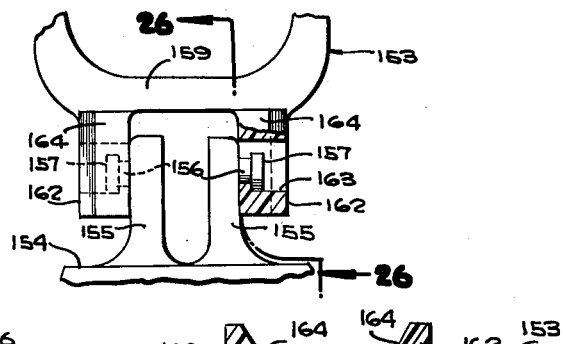
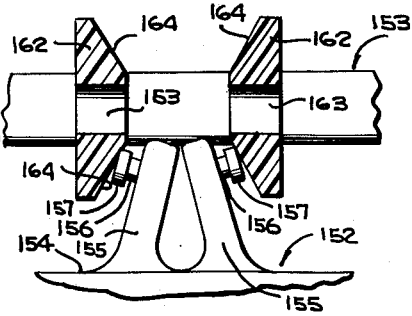
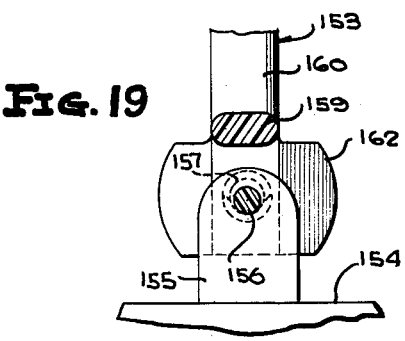
INVENTORS
JOHN HENCHERT &
HENRY E. FRANKENBERG
BY
ATTORNEYS United States Patent Office 3,158,284
Patented Nov. 24, 1964

3,158,284
PLASTIC HANDLE AND CLEAT ATTACHMENT
FOR CONTAINERS
John Henchert, River Forest, and Henry E. Frankenberg,
Berwyn, Ill., assignors to Continental Can Company,
Inc., New York, N.Y., a corporation of New York
Filed Mar. 30, 1961, Ser. No. 99,567
27 Claims. (Cl. 220—91)

This invention relates in general to new and useful improvements in handle constructions for containers, and more particularly relates to a novel plastic handle and cleat attachment for containers.

The primary object of this invention is to provide a novel handle and cleat assembly for containers, the cleat of the assembly being of a configuration to permit it to be readily snapped through an opening in a container wall and when so inserted in the opening, the cleat will interlock with the container wall to be retained in place therein and will close the opening to retain the sealed condition of the container wall, and the handle of the assembly being of a type wherein it may be readily engaged with the cleat after it has been passed through the container wall.

Another object of the invention is to provide a novel handle construction for use in conjunction with containers, the handle construction including a cleat and a handle pivotally connected to the cleat, the cleat being provided with an enlarged lower flange adapted to engage the inner side of a container wall with a measured portion of the cleat passing through an opening in the container wall and the cleat being interlocked with the container wall so that movement of the cleat into the container is resisted, the enlarged flange preventing withdrawal of the cleat outwardly through the container wall, and the handle being connected to the cleat by a hinge connection which is of a nature that permits the ready assembling of the handle with the cleat after the cleat has been passed through the container wall.

Yet another object of this invention is to provide a novel cleat and handle assembly which includes a cross-bar and a socket disposed in cooperating relation and permitting relative rotation between the handle and the cleat as well as the separation of the handle from the cleat when desired, and the cross-bar and socket having cooperating interlocking portions preventing separation of the handle from the cleat when the handle is in an article carrying position.

Another object of this invention is to provide a novel cleat and handle assembly wherein both the cleat and the handle are formed of a suitable plastic material, and the handle is pivotally connected to the cleat by a suitable hinge assembly which includes at least a portion of the handle or of the cleat which is deformable to permit the interengagement of components of the hinge assembly.

Still another object of this invention is to provide a novel cleat and handle construction which is of a two-piece arrangement with both the handle and cleat having components of a hinge to pivotally connect the handle to the cleat, and the hinge construction being of a nature which permits the ready assembling of the handle with the cleat.

A further object of this invention is to provide a novel cleat and handle construction wherein the cleat has an elongated socket portion with an entrance opening thereinto, and the handle has a bar portion which is generally of a rectangular cross-section and is movable into the socket portion through the entrance opening when the handle is disposed generally at right angles to the angle of force applied thereto in the use of the handle and cleat assembly, whereby when the assembly is being utilized, the width of the bar portion presented to the entrance opening is greatly in excess of the width of the entrance opening and withdrawal of the handle from the cleat under normal usage is prevented.

Still another object of the invention is to provide a novel handle and cleat assembly wherein the cleat assembly is provided with a pair of socket portions which are movable apart for the reception of oppositely directed pin portions therein, and the socket portions are resilient whereby once the pin portions are engaged therein, the socket portions return to their normal positions and retain the pin portions therein.

Yet another object of this invention is to provide a novel handle and cleat assembly wherein the cleat is provided with a socket portion and the handle includes a lower bar portion which is interrupted, and the handle being in the form of a loop which permits the movement of the ends of the bar portions apart to facilitate the movement of the two halves of the bar portion into opposite ends of the socket portion to facilitate the connection of the handle to the cleat.

A further object of this invention is to provide a novel handle and cleat assembly wherein the cleat is provided with a pair of pin portions each of which is formed of two parallel, transversely spaced parts, wherein the transverse dimension of each pin portion may be momentarily reduced, and the handle is provided with a pair of socket portions which have entrance openings generally of a width equal to the transverse dimension of the associated pin portion, whereby the socket portion may be engaged with the pin portions only when the pin portions are compressed and the entrance openings of the socket portions are aligned with the minimum width dimensions of the pin portions.

Yet another object of this invention is to provide a novel cleat and handle assembly wherein the cleat is provided with a pair of spaced upstanding ears having pins extending in opposite directions therefrom, and the ears being movable towards one another to decrease the spacing between the remote ends of the pins, and the handle has a pair of spaced apart socket portions which are spaced apart a distance which permits the engagement of the pins into the socket portions when the ears are in their squeezed positions.

A still further object of the invention is to provide a novel handle and cleat assembly wherein the cleat includes a support having a pair of pins extending in opposite directions therefrom, and the support carries above the pin a wedge member, the handle being provided with a pair of spaced apart socket portions which are movable apart and which are adapted to be engaged with the wedge members for movement apart and into engagement over the ends of the pins.

With the above, and other objects in view that will hereinafter appear, the nature of the invention will be more clearly understood by reference to the following detailed description, the appended claims and the several views illustrated in the accompanying drawings:

In the drawings:

FIGURE 1 is a perspective view of a first form of handle construction in accordance with this invention, and shows the cleat thereof engaged with a container end and the handle in place with respect to the cleat.

FIGURE 2 is an enlarged fragmentary vertical sectional view taken along the line 2—2 of FIGURE 1, and shows the specific construction of the cleat, the relationship of the cleat to the container wall, and the connection between the cleat and the handle, the handle being shown in a lowered position by phantom lines.

FIGURE 3 is an exploded perspective view of the handle and cleat slightly rotated from the positions of FIGURE 1 and with the handle separate from the cleat.

FIGURE 4 is an enlarged fragmentary sectional view taken through the upper portion of the cleat and shows the movement of a bar portion of the handle into the socket portion of the cleat through an entrance opening thereof.

FIGURE 5 is an enlarged fragmentary sectional view taken through the upper portion of the cleat, and shows the socket portion of the cleat as having a flat upper inner wall for engagement with the bar portion of the handle.

FIGURE 6 is a perspective view of another form of handle which may be utilized with the cleat of FIGURES 1 through 5.

FIGURE 7 is an exploded perspective view of another form of handle construction wherein the handle is of a T-shaped configuration and the socket portion of the cleat is divided to receive the shank of the handle, the cleat being shown attached to a container wall.

FIGURE 8 is an enlarged transverse vertical sectional view taken through the central portion of the cleat and shows the specific relationship of the handle with respect to the cleat, the handle being shown in part in a lowered position by phantom lines.

FIGURE 9 is an enlarged fragmentary vertical sectional view taken along the line 9—9 of FIGURE 8, and shows the relationship of the lower portion of the handle with respect to the socket portion of the cleat.

FIGURE 10 is an exploded perspective view of another form of handle and cleat assembly, with the handle being separate from the cleat and the cleat being secured to a container wall.

FIGURE 11 is an enlarged fragmentary vertical sectional view taken through the socket portion of the cleat and shows the relationship of the handle with respect thereto.

FIGURE 12 is an enlarged fragmentary vertical sectional view similar to FIGURE 11 and shows the handle being engaged with the cleat.

FIGURE 13 is an exploded perspective view of still another form of handle and cleat assembly, with the handle being separate from the cleat and the cleat being in place in a container wall.

FIGURE 14 is an enlarged fragmentary vertical sectional view, taken through the upper portion of the cleat, and shows the connection between the handle and the cleat.

FIGURE 15 is an enlarged fragmentary transverse vertical sectional view taken along the line 15—15 of FIGURE 14 and shows specifically the relationship of the handle with respect to the cleat.

FIGURE 16 is an enlarged fragmentary center longitudinal sectional view similar to FIGURE 14, and shows the handle in a position moving into engagement with the cleat.

FIGURE 17 is an exploded perspective view of yet another form of handle construction, with the handle being separate from the cleat and the cleat attached to a container wall.

FIGURE 18 is an enlarged fragmentary elevational view showing the specific relationship of the handle with respect to the cleat.

FIGURE 19 is an enlarged fragmentary transverse vertical sectional view, taken along the line 26—26 of FIGURE 25, and shows clearly the relationship of the handle with respect to the cleat.

FIGURE 20 is an enlarged fragmentary elevational view, with the socket portions of the handle shown in section, and with the handle in the process of being engaged with the cleat.

Reference is now made to the drawings in detail, wherein a first form of the invention is illustrated in FIGURES 1 through 4, inclusive. The handle construction illustrated in these figures is generally referred to by the numeral 40, and includes a handle, generally referred to by the numeral 41, and a cleat, generally referred to by the numeral 42. The cleat 42 is illustrated as being carried by a container wall 43.

Reference is now made to FIGURE 2, wherein it will be seen that the container wall 43 has an opening 44 therethrough defined by an upstanding collar 45. The cleat 42 is partially passed through the opening 44 and is anchored therein in sealed relation.

The cleat 42 includes a base formed of a flange 46 having engagement with the inner surface of the container wall 43 around the opening 44, and a plug portion 47 which is formed integrally with the flange 46. The plug portion 47 has a peripheral groove 48 in which the collar 45 is seated, thus forming an interlock between the plug portion 47 and the container wall 43.

The cleat 42 is preferably formed of a yielding plastic material such as polyethylene and the handle 41 may be formed of a more rigid plastic material, such as polystyrene. Thus, it is possible to deform the plug portion 47 to facilitate the movement thereof through the opening 44 and the engagement of the collar 45 into the peripheral groove 48. To facilitate the movement of the plug portion 47 through the opening 44, the upper part of the plug portion 47 above the annular groove 48 is tapered, as at 49. Also, in order to increase the resiliency of the plug portion 47, the underside of the plug portion 47 is provided with a cavity 50. When it is desired to assemble the cleat 42 and the container of which the wall 43 is a part, it is merely necessary to snap the cleat 42 through the opening 44 in an action which results in the automatic locking of the cleat 44 with respect to the container wall 43.

The cleat 42 also includes a socket portion 51 which extends upwardly from the top surface of the plug portion 47. The socket portion 51 is of lesser width than the diameter of the plug portion 47 and has a length almost equal to the length of the plug portion 47. The socket portion 51 is formed by a pair of generally parallel, C-shaped cross-sectional members 52 which are disposed in opposed relation and define a bore 53. The upper ends of the members 52 are spaced apart to define an entrance opening 54 which has a flared upper mouth, as at 55. The cleat 42 being formed of a resilient material, such as a plastic material, it will be seen that the width of the entrance opening 54 may be increased by forcing a member into engagement with the flared mouth 55 and then down through the entrance opening 54. At the inner end of the entrance opening 54, the members 52 are provided with parallel ears 56 which project into the bore 53.

The handle 41 is in the form of a continuous loop and includes an upper bar portion 57 which has integrally connected to the ends thereof generally semicircular end portions 58. The end portions 58 terminate in downwardly extending portions 59 which have a lower bar portion 60 extending between the lower ends thereof. The bar portion 60 has a length in excess of the length of the socket portion 51. Also, the transverse width of the bar portion 60 is less than the diameter of the bore 53. As is best illustrated in FIGURES 2 and 4, the bar portion 60 is preferably elongated in shape in cross-section to facilitate assembly with the cleat 42. The bar portion 60 is freely rotatable within the bore 53 so that the handle 41 is mounted for pivotal movement relative to the cleat 42 when the two are assembled. However, the upper surface of the bar portion 60 is provided with a longitudinally extending recess 61 in which the ears 56 are received when the handle 41 is in an upright position. The interlock between the ears 56 and the bar portion 60 prevents separation of the members 52, thus preventing releasing of the handle 41 under a load.

In the assembling of the handle construction 40 of FIGURE 1, after the cleat 42 has been passed through the opening 44 in the container wall 43 and interlocked with the container wall 43, the handle 41 is then assembled with the cleat 42. This is accomplished by placing the handle 41 generally parallel to the container wall 43 and engaging one of the edges of the bar portion 60 with the flared mouth 55 of the entrance opening 54. Downward pressure is then exerted on the bar portion 60, with the result that the members 52 are spread apart to increase the width of the entrance opening 54 and to permit the movement of the bar portion 60 therethrough. Once the bar portion 60 is passed into the socket portion 51, although the entrance opening 54 is disposed uppermost, the bar portion 60 will not pull back out through the entrance opening 54 due to the width thereof and the bearing contact and interlock between the bar portion 60 and the ears 56 of the members 52.

Reference is now made to FIGURE 5, wherein there is illustrated a modified form of cleat which is generally referred to by the numeral 42'. The cleat 42' is identical with the cleat 42 with the exception that in lieu of having a circular cross-sectional bore 53 with the exception of the ears 56, the socket portion 51' of the cleat 42' has an opening 53' with a flattened upper portion. The flat surfaces defining the flattened upper portions of the bore 50 are referred to by the numeral 62, and are formed on the undersides of the upper portions of the members 52'. The flattened surfaces 62 provide seats for the flat upper surface of the bar 60 of the handle 41 which is used in conjunction with the cleat 42' outwardly of the ears 56'.

Reference is now made to FIGURE 6 in particular, wherein a modified form of handle, generally referred to by the numeral 63, is illustrated. The handle 63 is generally of a T-shaped configuration and may be considered to have a loop portion defined by a lower bar portion 64, upstanding bar portions 65, and an upper bar 66. The upper bar 66 has integral extensions 67 which, together with the upper bar 66, define a cross-bar of the T-shaped handle 63 and the upper bar 66 and the extensions 67 serve as a grip member. The lower bar portion 64 is grooved similarly to the bar portion 60 and is engaged with the cleats 42 and 42' in the same manner as is the bar portion 60.

Another form of handle construction is illustrated in FIGURES 7, 8 and 9, and is generally referred to by the numeral 68. The handle construction 68 includes a handle, generally referred to by the numeral 69, and a cleat, generally referred to by the numeral 70. The cleat 70 is engaged in the container wall 43 in the same manner as is the cleat 42 in the container wall 43. The cleat 70 includes a lower flange 71 which corresponds to the flange 46, and an upwardly projecting plug portion 72 which corresponds to the plug portion 47. The cleat 70 is formed of a suitable deformable and resilient material, such as a plastic material which may include polyethylene.

A socket portion 73 is formed integral with the plug portion 72. The socket portion 73 is very similar to the socket portion 51, but differs therefrom in that the socket portion 73 is transversely divided into two longitudinal halves. The socket portion 73 is defined by four generally C-shaped members 74 which are formed integral with the plug portion 72 and project upwardly therefrom. The members 74 are arranged in pairs wherein the two members of a pair are in opposed relation and the two members of each pair are longitudinally spaced from the two members 74 of the other pair. Each pair of members 74 defines a bore 75 and the two bores are in alignment. Also, each pair of members 74 has an upper entrance opening 76 into the respective bore 75 with the entrance opening 76 having a flared mouth 77. At the inner or lower end of the entrance opening 75, the members 74 are provided with parallel ears 78 which project into the bores 75.

The handle 69 is of a generaly T-shaped construction and includes an upper cross-bar 79 and a shank 80. A lower bar portion 81 is connected to the lower end of the shank 80 in generally parallel relation to the cross-bar 79. The handle 69 may also be formed of a suitable plastic material, such as polystyrene. The upper surface of the lower bar portion 81 is provided with grooves 82 for receiving the ears 78 to interlock the members 74 with the lower bar portion 81 to prevent separation of the members 74 and the releasing of the handle 69.

It is to be noted from FIGURES 8 and 9 that when the handle 69 is assembled with the cleat 70, the lower bar portion 81 has the end portions thereof on opposite sides of the shank 80 engaged in the two bores 75. Due to the spacing of the pairs of members 74, a transverse slot 83 is formed, the slot 83 receiving the lower part of the shank 80. Thus, the handle 69 is free to rotate about the cleat 70 from an upstanding position, as is shown in full lines in FIGURE 8, to an out-of-the-way position, as is shown in part in phantom lines in FIGURE 8.

It is to be understood that the handle 69 is connected to the cleat 70 by disposing the handle 69 in a horizontal position and forcing the lower bar portion 81 down through the entrance openings 76 of the two pairs of members 74. Withdrawal of the bar portion 81 through the entrance openings 76 during the normal use of the handle construction 68 will be prevented due to the width of the bar portion 72 as compared to the narrowness of the entrance openings 76, the interlocks between the ears 78 and the lower bar portion 81, and the stiffness of the material from which the members 74 are formed.

The details of a handle construction, generally referred to by the numeral 84, are illustrated in FIGURES 10, 11 and 12. The handle construction 84 includes a handle, generally referred to by the numeral 85, and a cleat, generally referred to by the numeral 86. The cleat 86 has a plug portion 87 which is carried by the container wall 43 in the manner hereinbefore described.

The cleat 86 also includes a socket portion 88 which is formed integrally with and extends upwardly from the plug portion 87. The socket portion 88 is defined by two, generally parallel, upstanding members 89 which are connected together by an intermediate bridge portion 90 to define a bore 91 having an axis disposed generally parallel to the container wall 43. The bridge member 90 is of a wedge-shaped cross-section, as is best shown in FIGURE 11, and has opposite downwardly sloping surfaces 91.

The handle 85 is very similar to the handle 41, but differs therefrom in that in lieu of being a closed loop, it is an open loop. The handle 85 includes an upper bar portion 92, which like the bar portion 57, has an undersurface configurated to form a grip. A pair of generally semicircular end portions 93 are integrally connected to opposite ends of the upper bar portion 92. A pair of generally vertical portions 94 are connected to the end portions 93 at their lower ends and in depending relation. A pair of opposed lower bar portions 95 are connected to the lower ends of the vertical portions 94. As is best illustrated in FIGURE 11, the lower bar portions 95 are spaced slightly apart and have rounded lower corners 96.

In accordance with the invention, it is desirable that the cleat 86 be formed of resilient deformable material, such as plastic, and may be formed of polyethylene, while the handle 85 should be formed of a more rigid material, such as polystyrene. When the handle 85 is to be engaged with the cleat 86, the handle is moved downwardly relative to the cleat with the result that the rounded lower corners 96 of the lower bar portions 93 engage the sloping surfaces 91 of the wedge-shaped cross-sectional bridge member 90, as is shown in FIGURE 12. Downward pressure on the handle 86 results in the bar portions 95 spreading apart, and this spreading apart of the bar portions continues until such time as the bar portions 95 have passed beyond the bridge member 90, at which time the bar portions 95, due to the resiliency of the handle 85, move back into alignment and engage beneath the bridge member 90 and within the bore 91. The engagement of the bar portions 95 with the underside of the bridge member 90 is such that due to the stiffness of the material from which the handle 85 is formed, the deformation of the handle 85 and the accidental releasing of the handle 85 from the cleat 86 is prevented. The releasing of the handle 85 from the cleat 86 under load is also prevented by the interlocking of ears 97 projecting upwardly from the ends of the bar portions 95 with the bridge member 90 by being received in a groove 98 formed in the underside of the bridge member 90, as is best shown in FIGURE 11.

In FIGURES 13 through 16, there is illustrated another form of handle construction, generally referred to by the numeral 99. The handle construction 99 includes a handle, generally referred to by the numeral 100, and a cleat, generally referred to by the numeral 101. The cleat 101 is carried by the container wall 43 in the manner described above with respect to the previous cleats, and includes a plug portion 102 which projects upwardly through and above the container wall 43. The plug portion 102 carries a socket portion 103. The socket portion 103 is formed of a pair of ears 104, 104 which are integrally connected to the plug portion 102 and are disposed generally in spaced parallel relation, as is best shown in FIGURES 13 and 14. The ears 104 have aligned bores 105, 105 which extend generally parallel to the upper surface of the plug portion 102. The inner upper surface of each of the ears 104 is beveled, as at 106, for a reason to be set forth in detail hereinafter. It is to be understood that the cleat 101 is formed of a resilient and readily deformable material, such as plastic which may include polyethylene, and the ears 104 may be spread apart, as shown in FIGURE 16, to facilitate the mounting of the handle 100. Each ear 104 has a projection 107 depending into its bore 105 at the upper and inner part thereof.

The handle 100 includes a continuous loop formed of a lower bar portion 108 and an upper bar portion 109 connected together by semicircular end portions 110. The underside of the upper bar portion 109 is configurated, as at 111, to form a grip portion for the reception of one's fingers.

A support 112 depends from the underside of the lower bar portion 108 at the center thereof. A pair of aligned pins 113, 113 extend from opposite sides of the support 112 at the lower end thereof. The outer ends of the pins 113 have enlargements 114 which lock behind the projections 107. When the handle 100 is connected to the cleat 101, the pins 113 are received in the bores 105 to pivotally mount the handle 100 relative to the cleat 101. This is best shown in FIGURE 14.

In assembling the handle construction 99 on the container wall 43, the cleat 101 is first snapped through an opening formed in the container wall 43. Then, the handle 100 is assembled with the cleat 101. This is accomplished by moving the handle 100 directly downwardly against the cleat 101 with the pins 113 engaging the surfaces 106 of the ears 104. The downward camming action of the pins 113 against the ears 104 results in the spreading of the ears 104, as is shown in FIGURE 16. Continued downward movement of the handle 100 from the position illustrated in FIGURE 16 results in the pins 113 snapping into their respective bores 105. The handle 100 is now firmly interlocked with the cleat 101 and separation of the handle from the cleat under load is prevented by the ears 104 which have returned to their initial positions of FIGURE 14 entrapping the pins 113 in the bores 105.

In FIGURES 17 through 20, there are illustrated the details of another form of handle construction which is generally referred to by the numeral 151. The handle construction 151 includes a cleat, generally referred to by the numeral 152, and a handle, generally referred to by the numeral 153. The cleat 152 is carried by the container wall 116 in the same manner described with respect to the cleat 117.

The cleat 152 includes a plug portion 154 which corresponds to the plug portion 122 and projects upwardly through the container wall 116. A pair of ears 155 are integrally connected to the top surface of the plug portion 154 in spaced parallel relation. A pin 156 is carried by each of the ears 155 and the two pins 156 are disposed in alignment with each other and project in opposite directions from their respective ears 155. Each of the pins 156 is provided with an outer terminal enlargement 157. Although the ears 155 are normally disposed in spaced parallel relation, it is necessary when engaging the handle 153 with the cleat 152 to deform the ears 155. Also, it is necessary that the plug portion 154 be deformable in order that it may be passed through the container wall 117. Accordingly, the cleat 152 is formed of a suitable resilient deformable material, such as a plastic including polyethylene.

The handle 153 includes a lower loop portion 158 which includes a lower bar portion 159, a pair of upstanding side portions 160, and an upper bar 161, the bar 161 extending beyond the general area of the loop portion 158 and forming the grip member of the handle 153.

A pair of identical socket-forming members 162 is formed integral with the lower bar portion 159 and depends therefrom in spaced parallel relation. The two socket-forming members 162 have a aligned bores 163 therethrough for receiving the pins 156. As is best illustrated in FIGURE 20, the socket-forming members 162 have opposed sloping edge surfaces 164. The edge surfaces opposing each other flare outwardly from the bores 163. Each bore 163 is provided at its inner end with an upper depending projection 165 behind which a respective one of the projections 157 locks to prevent releasing of the handle 153 under load.

When it is desired to secure the handle 153 to the cleat 152 after the cleat 152 has been passed through the container wall 116, the handle 153 is turned to a position generally parallel to the top surface of the plug portion 154, and the sloping surfaces 164 are engaged with the pins 156. As the handle 153 is forced downwardly, the camming of the sloping surfaces 164 on the ends of the pins 156 deflect the ears 155 inwardly towards each other. Downward movement of the handle 153 continues until such time as the pins 156 snap into their respective bores 163 in the socket-forming members 162. The handle 153 is then firmly engaged with the cleat 152 and is free to pivot about the pins 156.

From the foregoing, it will be seen that novel and advantageous provision has been made for carrying out the desired end. However, attention is again directed to the fact that variations may be made in the example handle constructions disclosed herein without departing from the spirit and scope of the invention, as defined in the appended claims.

We claim:

1. A handle construction for containers comprising a one-piece plastic cleat and a handle, said cleat including a plug portion, and a hinge connection between said handle and said cleat, said hinge connection comprising integral positive locking means forming portions of both said handle and said cleat, said locking means including at least one recess means and a projecting member, said handle being movable between a first locked and a second unlocked position, and said projecting member being engageable in said recess means only in the locked position of the handle with respect to the cleat.

2. The handle construction as defined in claim 1 wherein said recess forms a portion of said handle and said projecting member forms a portion of the cleat.

3. The handle construction as defined in claim 1 wherein said recess forms a portion of said cleat and said projecting member forms a portion of said handle.

4. The handle construction as defined in claim 1 wherein said hinge connection includes means temporarily deformable to facilitate the connecting together of said handle and said cleat.

5. The handle construction as defined in claim 1 wherein said recess forms a portion of said handle and said projecting member forms a portion of the cleat, said hinge connection including means temporarily deformable to facilitate the connecting together of said handle and said cleat.

6. The handle construction as defined in claim 1 wherein said recess forms a portion of said cleat and said projecting member forms a portion of said handle, said hinge connection including means temporarily deformable to facilitate the connecting together of said handle and said cleat.

7. A handle construction for containers comprising a one-piece plastic cleat and a handle, said cleat including a plug portion, and a hinge connection between said handle and said cleat, said hinge connection comprising integral positive locking means forming portions of both said handle and said cleat, said locking means including at least one recess means and a projecting member, said handle being movable between a first locked and a second unlocked position, said projecting member being engageable in said recess only in the locked position of the handle with respect to the cleat, said handle having an elongated portion, said recess means opening upwardly in said elongated portion, said cleat including a sleeve, and said projecting member forming a portion of said sleeve.

8. A handle construction for containers comprising a one-piece plastic cleat and a handle, said cleat including a plug portion, and a hinge connection between said handle and said cleat, said hinge connection comprising integral positive locking means forming portions of both said handle and said cleat, said locking means including at least one recess means and a projecting member, said handle being movable between a first locked and a second unlocked position, said projecting member being engageable in said recess only in the locked position of the handle with respect to the cleat, said handle having an elongated portion, said recess means opening upwardly in said elongated portion, said cleat including a sleeve having a narrow longitudinally extending entrance opening defined by opposed entrance portions of said sleeve, and said projecting member forming a portion of at least one of said entrance portions.

9. A handle construction for containers comprising a one-piece plastic cleat and a handle, said cleat including a plug portion, and a hinge connection between said handle and said cleat, said hinge connection comprising integral positive locking means forming portions of both said handle and said cleat, said locking means including recess means and projecting members, said handle being movable between a first locked and a second unlocked position, said projecting members being each engageable in a respective one of the recess means only in the locked position of the handle with respect to the cleat, said handle being continuous and including an elongated portion, said recess means opening upwardly in said elongated portion, said cleat including a sleeve, and said projecting members forming portions of said sleeve projecting downwardly toward and into said recess means in the locked position of the handle.

10. A handle construction for containers comprising a one-piece plastic cleat and a handle, said cleat including a plug portion, and a hinge connection between said handle and said cleat, said hinge connection comprising integral positive locking means forming portions of both said handle and said cleat, said locking means including recess means and projecting members, said handle being movable between a first locked and a second unlocked position, said projecting members being each engageable in a respective one of the recess means only in the locked position of the handle with respect to the cleat, said handle being discontinuous and including an elongated portion, said recess means opening upwardly in said elongated portion, said cleat including a sleeve, and said projecting members forming portions of said sleeve projecting downwardly toward and into said recess means in the locked position of the handle.

11. The handle construction as defined in claim 10 wherein said recess means are a pair of recesses formed in said elongated portion and at least one of said projecting members is received in each of said recesses.

12. The handle construction as defined in claim 11 whereby the elongated portion is part of a generally inverted T-shaped stem portion, and said sleeve has a transverse groove receiving said stem portion.

13. A handle construction for containers comprising a one-piece plastic cleat and a handle including a continuous loop portion of which a flattened portion forms a lowermost part, said cleat including a plug portion, a hinge connection between said handle and said cleat, said hinge connection comprising integral positive locking means forming portions of both said handle and said cleat, said locking means including an elongated upwardly opening recess in said flattened portion, a sleeve integral with said cleat, said sleeve having a longitudinally extending narrow entrance opening defined by entrance portions, and a projecting member on each of said entrance portions directed downwardly toward and into said recess only when said handle is in a first locked vertical position thereof and disengaged when in a second unlocked position substantially normal to said first position.

14. A handle construction for containers comprising a one-piece plastic cleat and a handle including a stem portion of a generally inverted T-shaped configuration, said stem portion having a pair of upwardly opening recesses, said cleat including a plug portion, a hinge connection between said handle and said cleat, said hinge connection comprising integral positive locking means forming portions of both said handle and said cleat, said locking means including a sleeve integral with said cleat, said sleeve having a narrow longitudinal entrance opening, said entrance opening being defined by opposed entrance portions, each having a projecting member directed downwardly toward and into said recesses only when said handle is in a first locked vertical position thereof and disengaged when in a second unlocked position substantially normal to the first position, and a transverse groove dividing said sleeve and receiving the stem portion of the handle.

15. A handle construction for containers comprising a one-piece plastic cleat and a handle, said cleat including a plug portion, and a hinge connection between said handle and said cleat, said hinge connection comprising integral positive locking means forming portions of both said handle and said cleat, said locking means including at least one recess means and projecting members, said handle being movable between a first locked and a second unlocked position, said projecting members being engageable in said recess means only in the locked position of the handle with respect to the cleat, said recess means opening downwardly in a bridging portion of said cleat, said handle being discontinuous and terminates in opposed ends, and said projecting members being directed upwardly from each of said ends into said recess means.

16. A handle construction for containers comprising a one-piece plastic cleat and a handle, said cleat including a plug portion, and a hinge connection between said handle and said cleat, said hinge connection comprising integral positive locking means forming portions of both said handle and said cleat, said locking means including at least one recess means and projecting members, said handle being movable between a first locked and a second unlocked position, said projecting members being engageable in said recess means only in the locked position of the handle with respect to the cleat, said recess means opening downwardly in a bridging portion of said cleat, two integral upstanding members supporting the bridging portion to define bore means, said recess means being formed in said bridging portion and opening downwardly into said bore means, said handle being discontinuous and terminating in opposed ends, said ends being positioned in said bore, and said projecting members being directed upwardly from each of said ends into said recess means.

17. The handle construction as defined in claim 15 wherein said bridging portion is wedge-shaped in cross-section for facilitating the positioning of said ends beneath the bridge portion.

18. The handle construction as defined in claim 16 wherein said bridging portion is wedge-shaped in cross-section for facilitating the positioning of said ends beneath the bridge portion.

19. A handle construction for containers comprising a one-piece plastic cleat and a handle, said cleat including a plug portion, and a hinge connection between said handle and said cleat, said hinge connection comprising integral positive locking means forming portions of both said handle and said cleat, said locking means including at least one recess means and projecting members, said handle being movable between a first locked and a second unlocked position, said projecting members being engageable in said recess means only in the locked position of the handle with respect to the cleat, said recess means opening downwardly in a bridging portion of said cleat, said handle having oppositely directed ends carrying said projecting members, and said projecting members being directed upwardly from each of said ends into said recess means.

20. A handle construction for containers comprising a one-piece plastic cleat and a handle, said cleat including a plug portion, and a hinge connection between said handle and said cleat, said hinge connection comprising integral positive locking means forming portions of both said handle and said cleat, said locking means including at least one recess means and projecting members, said handle being movable between a first locked and a second unlocked position, said projecting members being engageable in said recess means only in the locked position of the handle with respect to the cleat, said recess means opening into a bore means in each of a pair of sleeves forming integral portions of said cleat, each sleeve including two upstanding members supporting a bridging portion, a recess of said recess means opening from said bridging portions into said bore means, said handle being discontinuous and terminating in opposed ends, said ends being positioned in said bore means, and said projecting members being directed from each of said ends into associated ones of said recesses.

21. The handle construction as defined in claim 20 wherein said bridging portions are wedge-shaped in cross-section for facilitating the position of said ends beneath the bridge portion.

22. The handle construction as defined in claim 20 wherein said projecting members are generally curved in cross-section.

23. A handle construction for containers comprising a one-piece plastic cleat and a handle, said cleat including a plug portion, and a hinge connection between said handle and said cleat, said hinge connection comprising integral positive locking means forming portions of both said handle and said cleat, said locking means including at least one recess means and projecting members, said handle being movable between a first locked and a second unlocked position, said projecting members being engageable in said recess means only in the locked position of the handle with respect to the cleat, said recess means opening upwardly in a depending bridging portion of said handle, said projecting members being supported by at least a single member carried by the cleat, and said projecting members being directed downwardly into said recess means.

24. A handle construction for containers comprising a one-piece plastic cleat and a handle, said cleat including a plug portion, and a hinge connection between said handle and said cleat, said hinge connection comprising integral positive locking means forming portions of both said handle and said cleat, said locking means including at least one recess means and projecting members, said handle being movable between a first locked and a second unlocked position, said projecting members being engageable in said recess means only in the locked position of the handle with respect to the cleat, said recess means being a recess opening upwardly in a bore of each of a pair of socket-forming members of the handle, each of the projecting members being supported by an upstanding ear of the cleat, and said projecting member being directed downwardly into an associated one of each of said recesses.

25. The handle construction as defined in claim 23 wherein wedging means are provided for facilitating the positioning of said projecting members into said recess means.

26. A handle construction for containers of the type having an apertured wall, said handle construction comprising a cleat in the handle, said cleat including a base portion, an elongated sleeve of resilient material connected to said base portion, said sleeve having a longitudinally extending narrow entrance opening remote from said base portion, and said handle including a flattened bar extending through at least a major portion of said sleeve, and being freely rotatable therein, said entrance opening having a flared entrance portion to facilitate spreading apart of portions of said sleeve on opposite sides of said entrance opening and permit the edgewise movement of said bar therethrough, said flattened bar and said sleeve have an interlocking projection and recess connection to prevent spreading apart of said sleeve portions under load.

27. A handle construction for containers of the type having an apertured wall, said handle construction comprising a cleat and a handle, said cleat including a base portion, an elongated sleeve of resilient material connected to said base portion, said sleeve having a longitudinally extending narrow entrance opening remote from said base portion, said entrance opening having a flared entrance portion to facilitate spreading apart of portions of said sleeve on opposite sides of said entrance opening and permit the edgewise movement of said bar therethrough, and said handle including a continuous loop portion of which a flattened bar forms a lowermost part, said bar extending entirely through said sleeve and being freely rotatable therein except when said handle is in an upright loaded position, said sleeve portions having depending ears adjacent said entrance opening and said flattened bar having an upper recess receiving said ears to prevent spreading apart of said sleeve portions under load.

References Cited in the file of this patent

UNITED STATES PATENTS

| | | |
|---|---|---|
| 374,466 | Fitzsimmons | Dec. 6, 1887 |
| 748,581 | Carll | Jan. 5, 1904 |
| 1,874,629 | Rollason | Aug. 20, 1932 |
| 2,338,082 | Brewton | Jan. 4, 1944 |
| 2,697,539 | Warner | Dec. 21, 1954 |
| 2,765,094 | Ryan | Oct. 2, 1956 |
| 2,963,204 | Pottle | Dec. 6, 1960 |

FOREIGN PATENTS

| | | |
|---|---|---|
| 263,219 | Great Britain | Dec. 20, 1926 |
| 559,369 | Belgium | Oct. 14, 1957 |
| 1,217,771 | France | Dec. 14, 1959 |